US010688558B2

(12) United States Patent
Barua et al.

(10) Patent No.: US 10,688,558 B2
(45) Date of Patent: Jun. 23, 2020

(54) SETTER ASSEMBLY FOR ADDITIVE MANUFACTURING

(71) Applicant: General Electric Company, Schenectady, NY (US)

(72) Inventors: Ananda Barua, Glenville, NY (US); Sathyanarayanan Raghavan, Ballston Lake, NY (US); Ken Salas Nobrega, Schenectady, NY (US); Vadim Bromberg, Schenectady, NY (US); Arunkumar Natarajan, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 199 days.

(21) Appl. No.: 16/001,565

(22) Filed: Jun. 6, 2018

(65) Prior Publication Data

US 2019/0375006 A1 Dec. 12, 2019

(51) Int. Cl.
*B22F 3/00* (2006.01)
*B33Y 10/00* (2015.01)
(Continued)

(52) U.S. Cl.
CPC .............. *B22F 3/008* (2013.01); *B28B 1/001* (2013.01); *B29C 64/165* (2017.08);
(Continued)

(58) Field of Classification Search
None
See application file for complete search history.

(56) References Cited

U.S. PATENT DOCUMENTS

| 5,755,570 A | 5/1998 | Shinde et al. |
| 6,352,669 B1 | 3/2002 | Cooper et al. |

(Continued)

FOREIGN PATENT DOCUMENTS

| EP | 0633440 A1 | 1/1995 |
| EP | 3081322 A1 | 10/2016 |
| WO | 2016061302 A1 | 4/2016 |

OTHER PUBLICATIONS

International Search Report and Written Opinion for PCT Application No. PCT/US/2019/035675 dated Sep. 12, 2019.
(Continued)

*Primary Examiner* — Mary Lynn F Theisen
(74) *Attorney, Agent, or Firm* — Fletcher Yoder, P.C.

(57) ABSTRACT

A setter assembly for use in additive manufacturing a binder-jet part includes a base, a first setter component having a first setter portion and a second setter portion that may be removably coupled to the first setter portion and a plurality of protrusions disposed on and extending away from a surface of the base. The plurality of protrusions may align the base with the first setter component and enable coupling of the first setter component to the base. The setter assembly also includes a second setter component positioned between the base and the first setter component. The second setter component is disposed on the surface and the first setter component, the second setter component, and the base can be assembled onto a printed part such that at least a portion of the printed part is nested between the first setter component and the second setter component.

23 Claims, 7 Drawing Sheets

(51) Int. Cl.
  *B33Y 40/00* (2020.01)
  *B33Y 80/00* (2015.01)
  *B29C 64/379* (2017.01)
  *B29C 64/165* (2017.01)
  *B28B 1/00* (2006.01)
  *C04B 35/634* (2006.01)
  *C04B 35/638* (2006.01)
  *C04B 35/622* (2006.01)
  *C04B 35/64* (2006.01)

(52) U.S. Cl.
  CPC ............ *B29C 64/379* (2017.08); *B33Y 10/00* (2014.12); *B33Y 40/00* (2014.12); *B33Y 80/00* (2014.12); *C04B 35/62218* (2013.01); *C04B 35/634* (2013.01); *C04B 35/638* (2013.01); *C04B 35/64* (2013.01); *C04B 2235/6026* (2013.01)

(56) References Cited

U.S. PATENT DOCUMENTS

| | | |
|---|---|---|
| 2004/0159985 A1 | 8/2004 | Altoonian et al. |
| 2007/0003426 A1* | 1/2007 | Lu .................. B22F 3/1017 |
| | | 419/30 |
| 2010/0028645 A1 | 2/2010 | Maguire et al. |
| 2016/0263656 A1 | 9/2016 | Scalzo et al. |
| 2016/0303654 A1 | 10/2016 | Derguti et al. |
| 2017/0252973 A1* | 9/2017 | Clark .................. B22F 5/10 |

OTHER PUBLICATIONS

Satyanarayana, A., et al.; "Applications of Laser Inspection for Precision Components", Materialstoday : proceedings, vol. 4, Issue: 2, pp. 1230-1235, 2017.

* cited by examiner

SETTER ASSEMBLY FOR ADDITIVE MANUFACTURING

BACKGROUND

The subject matter disclosed herein relates to additive manufacturing, and more particularly, to support structures used to support printed parts during post-printing thermal processing.

Additive manufacturing, also known as 3D printing, generally involves printing an article one layer at a time using specialized systems. In particular, a layer of a material (e.g., a metal and/or ceramic powder bed) is generally deposited on a working surface and bonded with another layer of the same or a different material. Additive manufacturing may be used to manufacture articles (e.g., fuel nozzles, fuel injectors, turbine blades, etc.) from computer aided design (CAD) models using techniques such as, but not limited to, metal laser melting, laser sintering, and binder jetting. These additive manufacturing techniques melt, sinter, and/or chemically bind layers of material to generate the desired article. Additive manufacturing facilitates manufacturing of complex articles and enables enhanced flexibility for customization of articles compared to other manufacturing techniques, such as molding (e.g., cast molding, injection molding). Additionally, additive manufacturing can reduce the overall manufacturing costs associated with generating these complex articles compared to molding techniques generally used.

BRIEF DESCRIPTION

In one embodiment, a setter assembly for use in additive manufacturing a binder-jet part includes a base, a first setter component having a first setter portion and a second setter portion that may be removably coupled to the first setter portion and a plurality of protrusions disposed on and extending away from a surface of the base. The plurality of protrusions may align the base with the first setter component and enable coupling of the first setter component to the base. The setter assembly also includes a second setter component positioned between the base and the first setter component. The second setter component is disposed on the surface and the first setter component, the second setter component, and the base can be assembled onto a printed part such that at least a portion of the printed part is nested between the first setter component and the second setter component.

In a second embodiment, a part manufactured via a binder-jet printing process includes the steps of heating a green body part formed from a plurality of printed layers above a first temperature to remove the binder used to print the part and generate a brown body part and coupling a setter assembly to the brown body part. The setter assembly includes a base, a top setter, a bottom setter positioned between the base and the top setter, and a plurality of support pins extending between the base and the top setter such that a terminus of each support pin of the plurality of support pins abuts an inward facing surface of the top setter, and a portion of the brown body part is positioned above the top setter, while another portion of the brown body is nested between the top setter and bottom setter. The binder-jet printing process further includes the step of heating the brown body part and the setter assembly above a second temperature to sinter the powder to generate the part. The setter assembly may support one or more regions of the brown body part to block distortion of the brown body part during heating to generate the part.

In a third embodiment, a method for additive manufacturing of a part includes assembling a setter assembly onto a binder-jet printed part. The setter assembly includes a base, a first setter component, a second setter component positioned between the base and the first setter component, and support pins extending between the base and the first setter component. A terminus of the support pins abuts an inward facing surface of the first setter component and at least a portion of the printed part is nested between the first setter component and the second setter component. The method also includes heating the printed part and the setter assembly to debind or sinter the binder-jet printed part. A length of the support pins decreases in response to thermal processing of the binder-jet printed part to enable movement of the first setter component toward the second setter component. The method further includes disassembling and removing the setter assembly from the thermally-processed part.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
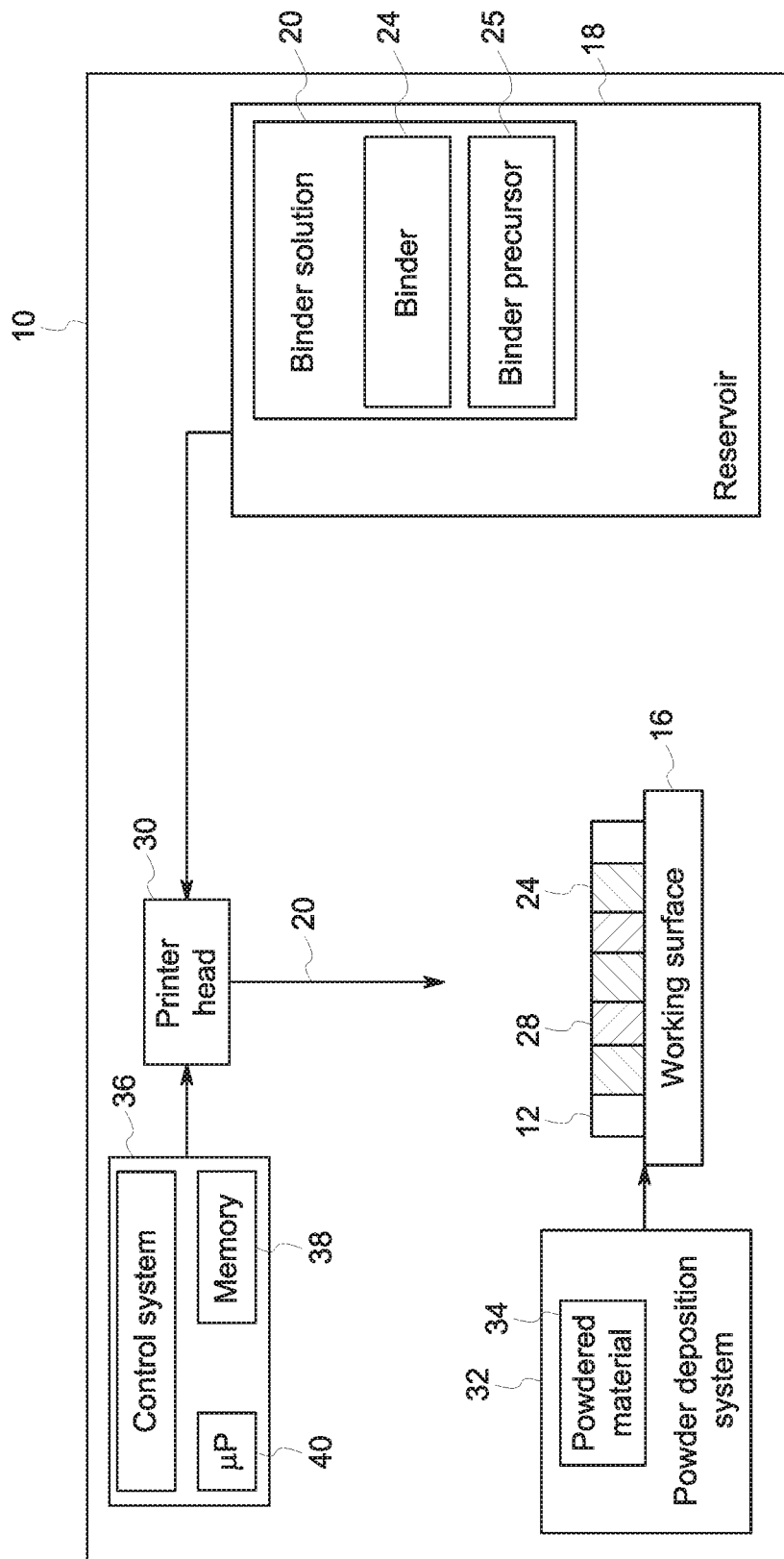
FIG. 1 is a block diagram of an embodiment of a binder-jet printer used to print a part having internal channels.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with systemrelated and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

There are numerous techniques for manufacturing articles, such as metal and ceramic parts used in a variety of machinery. For example, molding techniques, such as sand molding, cast molding, and/or injection molding, among others, may be used to manufacture metal and ceramic parts for machinery applications. As noted above, other techniques that may be used to manufacture metal and ceramic parts include additive manufacturing. For example, additive manufacturing techniques that may be used to manufacture articles include, but are not limited to, laser melting, laser sintering, and binder jetting. Additive manufacturing can be advantageous for fabricating parts compared to molding techniques due, in part, to the increased flexibility of materials that may be used, the enhanced ability to manufacture complex articles, and reduce manufacturing costs.

Unlike laser melting and laser sintering additive manufacturing techniques, which heat the material to consolidate and build layers of the material to form a printed part (e.g., metal or ceramic part), binder jetting uses a chemical binder to bond particles of the material into layers that form a green body of the printed part. As defined herein, the green body of the printed part (or green body part) is intended to denote a binder-jet printed part that has not undergone heat treatment to remove the chemical binder. During manufacturing, the chemical binder (e.g., a polymeric adhesive) is selectively deposited onto a powder bed in a pattern representative of a layer of the part being printed. Each printed layer is cured (e.g., via heat, light, moisture, solvent evaporation, etc.) after printing to bond the particles of each layer together to form the green body part. After the green body part is fully formed, the chemical binder is removed to form a brown body part. As defined herein, the brown body of the printed part (or brown body) is intended to denote a printed part that has undergone heat treatment to remove the chemical binder. Following removal of the chemical binder, the brown body part is sintered to consolidate the build layers and form a consolidated part.

In certain post-printing thermal processes (e.g., heat treatment, sintering), the brown body part may be heated to temperatures above approximately 1000 degrees Celsius (° C.) to enable consolidation of the material (e.g., metal or ceramic particles) in the build layers. As defined herein, post-printing thermal processing is intended to denote a thermal process that includes heating the printed part to a temperature above a debinding temperature (e.g., above 200° C.). During heat treatment, the brown body part undergoes thermally induced processes that may result in distortion of the brown body part during thermal processing. For example, sintering the brown body part to consolidate the build layers causes volumetric shrinkage and densification of the brown body part to form the consolidated part. The shrinkage of the brown body part may result in distortion of certain structural features (e.g., an overhang, airfoil, or the like). Additionally, gravitational forces may induce warping or sagging of certain structural features of the brown body part during thermal processing. The distortion of the brown body part may affect the overall geometry of the consolidated part in a manner that renders the consolidated part unsuitable for use. Printed parts having complex geometries may be more prone to thermally induced distortions compared to printed parts have simple and non-complex geometries. It is presently recognized that distortion of printed parts having complex geometries or expected to have a large amount of distortion (e.g., greater than approximately 20% distortion) may be mitigated by using a support that allows for dimensional changes during heat treatment to form the consolidated part.

Disclosed herein are setter assemblies that may be used to provide support to binder-jet printed parts during post-printing thermal processing to facilitate manufacture of parts having complex geometries. As discussed in further detail below, the setter assemblies disclosed herein are assembled onto the printed part prior to sintering. The setter assemblies provide support to regions of the printed part that may be prone to thermally induced distortion. The setter assemblies also allow for dimensional changes of the printed part resulting from densification (e.g., consolidation of printed layers) of the printed part to form the consolidated part. A geometry of the setter assemblies may be based on a geometry of the printed part. That is, the setter assemblies disclosed herein include structural features that are complimentary to certain structural features of the printed part. As such, the printed part is properly positioned and supported by the respective setter assembly. Additionally, the setter assembly may include features that facilitate assembly onto the printed part and disassembly to remove (e.g., separate) the setter assembly from the consolidated part. Disassembly and separation of the setter assembly from the printed part is done in a manner that does not affect the integrity of the consolidated part. Therefore, the presently disclosed setter assemblies may be used to mitigate distortion (of printed parts having complex geometries) during post-printing thermal processing, which can reduce manufacturing cost and improve production yields.

With the foregoing in mind, FIG. 1 is a block diagram of a binder jet printer 10 that may be used to print a part that can be coupled to a setter assembly to support certain structural features of the printed part during thermal processes. In operation, the binder jet printer 10 selectively deposits a binder into the portion of a layer 12 of powder (e.g., metal and/or ceramic) that is used to print an additively manufactured part, in accordance with embodiments of the present approach. In the illustrated embodiment, the binder jet printer 10 includes a working platform 16 (e.g., a stage) that supports the layer of powder 12, a reservoir 18 that stores a binder solution 20 having a binder 24 and/or or binder precursor 25, a printer head 30 that is fluidly coupled to the reservoir 18, and a powder deposition system 32 that deposits a powdered material 34 to form the layer 12 of powder. The binder precursor 25 includes monomers that may be polymerized in situ on the layer of powder 12 after deposition to form the binder 24. The binder solution 20 may include additional components such as, but not limited to, wetting agents, viscosity modifiers, or the like. The printer head 30 selectively deposits the binder solution 20 into the layer of powder 12 to print (e.g., selectively deposit) the binder 24 onto and into the layer 12 in a pattern that is representative of the layer of the part being printed.

The illustrated binder jet printer 10 includes a control system 36 that controls operation of the binder jet printer 10. The control system 36 may include a distributed control system (DCS) or any computer-based workstation that is fully or partially automated. For example, the control system 36 can be any device employing a general purpose computer or an application-specific device, which may generally include memory circuitry 38 storing one or more instructions for controlling operation of the binder jet printer 10. The memory 38 may also store CAD designs representative of a structure of the article being printed. The processor may include one or more processing devices (e.g., microprocessor 40), and the memory circuitry 38 may include one or more tangible, non-transitory, machine-readable media collectively storing instructions executable by the processing device 40 to enable the functionality described herein.

Figure 2:
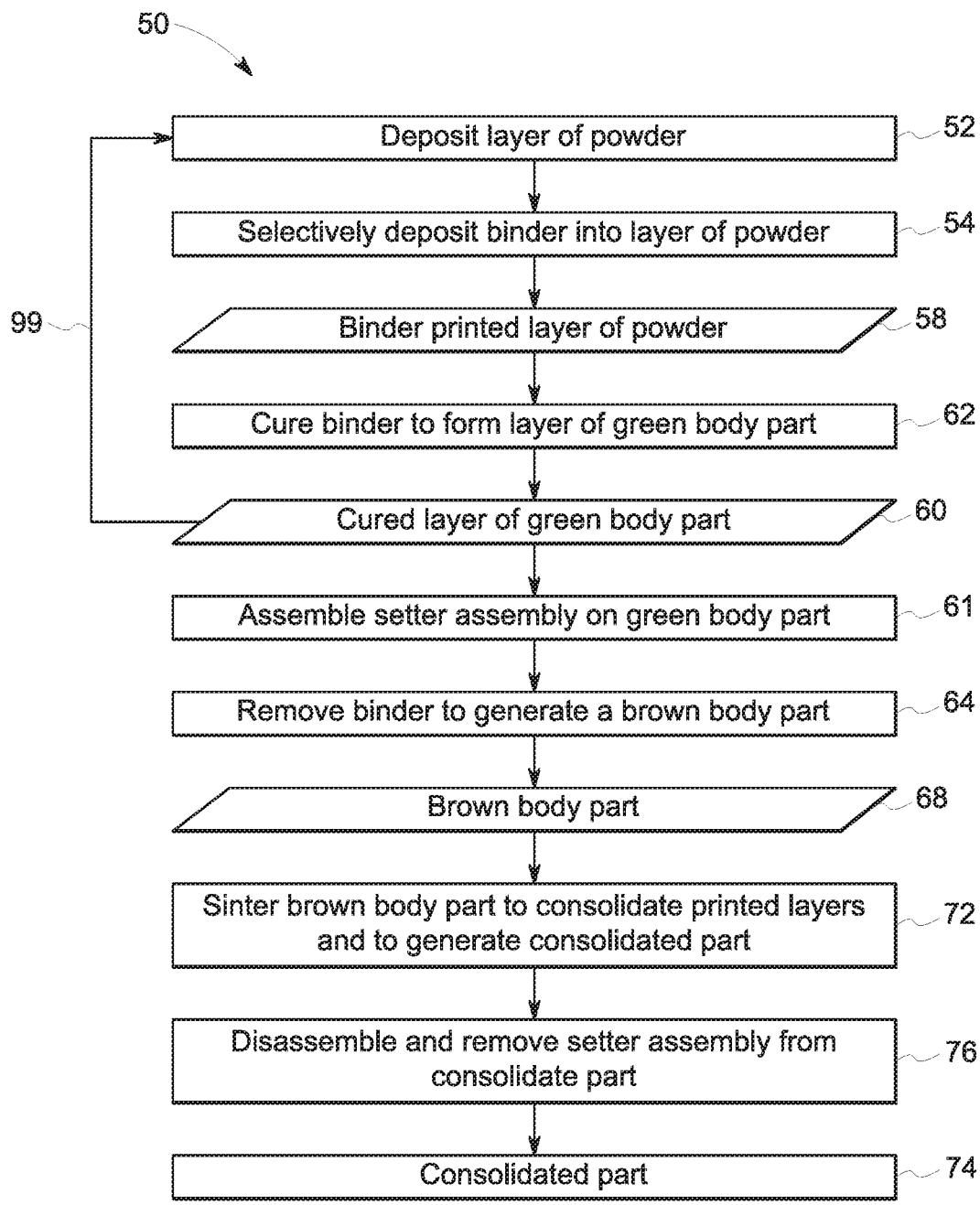
FIG. 2 is a flow diagram of an embodiment of a method of manufacturing a article via a binder-jet printing process that uses a setter assembly to support a printed part during a post-printing thermal process used to generate the article.

FIG. 2 is a block diagram depicting a method 50 for manufacturing an article via binder-jet manufacturing process using the setter assembly disclosed herein to provide support for a printed part (e.g., a green and/or a brown body part) during post-printing processing, in accordance with embodiments of the present approach. Certain aspects of the method 50 are executed by the processor 40 according to instructions stored in the memory 38 of the control system 36. The illustrated embodiment of the method 50 begins with depositing (block 52) the layer 12 of the powder that is used to manufacture an article of interest. For example, the layer 12 of the powdered material 34 (e.g., metallic and/or non-metallic powder) is deposited on a working surface to form a powder bed. As used herein, a "working surface" is intended to denote a surface onto which a powder bed layer or a binder solution may be deposited onto during binder jet printing processes. The working surface may include a working platform of a binder jet printer, a layer of powder, or a binder printed layer. For example, referring back to FIG. 1, in certain embodiments, the working surface may be the working platform 16 of the binder jet printer 10 (e.g., when the layer 12 is the first layer of the green body part). In other embodiments, the working surface may be a previously printed layer. The powdered material 34 may be deposited onto the working surface using the powder deposition system 32. In certain embodiments, the powder deposition system 32 deposits the layer 12 such that the layer 12 has a thickness of between approximately 10 microns (μm) and approximately 200 μm (e.g., approximately 40 μm or less). However, in other embodiments, the thickness of the layer 12 may be any suitable value.

The part to be printed may include a variety of parts having complex, 3D shapes, such as, but not limited to, fuel tips, fuel nozzles, shrouds, micro mixers, turbine blades, or any other suitable part. Therefore, the powdered material 34 used to print the article may vary depending on the type of article and the end use of the article (e.g., gas turbine engines, gasification systems, etc.). The material 34 may include metallic and/or non-metallic materials. By way of non-limiting example, the material 34 may include: nickel alloys (e.g., Inconel 625, Inconel 718, René 108, René 80, René 142, René 195, and René M2, Marm-247); cobalt alloys (e.g., Hans 188 and L605); cobalt-chromium alloys, cast alloys: (e.g., X40, X45, and FSX414), titanium alloys, aluminum-based materials, tungsten, stainless steel, metal oxides, nitrides, carbides, borides, aluminosilicates, ceramics, or any other suitable material and combinations thereof. In certain embodiments, the material 34 includes particles having a particle size distribution (e.g., $d_{50}$) that is between approximately 1 micron (μm) and approximately 75 μm. However, in other embodiments, the material 34 may utilize particles of any other suitable particle size distribution.

Returning to FIG. 2, following deposition of the layer of powder 12, the method 50 continues with selectively depositing (block 54) the binder 24 into portions of the layer 12 according to a predetermined pattern to generate a binder printed layer of powder 58. For example, as illustrated in FIG. 1, the binder 24 may be selectively printed into the layer of powder 12 using the printer head 30. As mentioned, the printer head 30 is generally controlled (e.g. operated, guided) by the control system 36 based on a CAD design, which includes a representation of the layer 12 of the part being printed.

The binder 24 coats particles in the powder layer 12, thereby generating binder-coated particles within the powder layer 12. As discussed below, after curing (e.g., via solvent evaporation, exposure to moisture, exposure to light), the binder 24 bonds the binder-coated particles (e.g., to one another, to the working surface) according to the printed pattern of binder solution 20 to form the binder printed layer of powder of a green body part 60, as indicated in FIG. 1.

The binder 24 may be selected from a class of thermoplastic or thermoset polymers that include, but are not limited to, polymers derived from unsaturated monomers. For example, the binder 24 may one or more polymers have the following formulas: $(CH_2CHR)_n$, where R=a proton (—H), hydroxyl (—OH), phenyl, alkyl, or aryl unit. The binder 24 may also include one or more mono-functional acrylic polymers having the formula $(CH_2—CR^2COOR^1)_n$, where $R^1$=an alkyl or aryl unit, and $R^2$=a —H or methyl (—CH$_3$) unit; di-acrylic polymers having the formula $[(CH_2—CR^2COO)_2—R^3]_n$, where $R^2$=a —H or —CH$_3$ unit and $R^3$=a divalent hydrocarbon radical; tri-acrylic polymers having the following formula $[(CH_2CR^1COO)_3—R^4]_n$, where $R^1$=—H or —CH$_3$ and $R^4$=a trivalent hydrocarbon radical and/or poly(alkylene carbonates) including co-polymeric alkylene carbonates, such as poly(ethylene-cyclohexene carbonate), poly(ethylene carbonate), poly(propylene carbonate, poly(cyclohexane carbonate), among others. In certain embodiments, the binder 24 may include poly(methylmethacrylate) (PMMA), polystyrene (PS), poly(vinyl alcohol) (PVA); poly(alkylene carbonates), for example QPAC® 25, 40, 100, and 130 from Empower Materials (located in New Castle, Del.), and polymers derived from hexanediol diacrylate (HDDA), trimethylolpropane triacrylate (TMPTA, for example, SR351 from Sartomer of Exton, Pa.), and diethylene glycol diacrylate (DGD).

As discussed above with reference to FIG. 1, the printer head 30 receives the binder solution 20 (e.g., ink) having the binder 24 and selectively prints (e.g., deposits, flash vaporizes and condenses) the binder 24 into portions of the layer of powder 12. Accordingly, the binder solution 20 may have certain properties that facilitate binder jet printing via the printer head 30. The binder solution 20 may include additives that facilitate deposition of the binder 24 into the layer 12. For example, in certain embodiments, the binder solution 20 includes one or more additives, including but not limited to: viscosity modifiers, dispersants, stabilizers, surfactants (e.g., surface active agents) or any other suitable additive that may facilitate jettability of the binder solution 20 and selective deposition of the binder 24 into the powder layer 12.

For example, in certain embodiments, the binder solution 20 may include surfactants. The surfactants may be ionic (e.g., zwitterionic, cationic, anionic) or non-ionic, depending on the properties of the binder 24 and/or the material 34, in different embodiments. By way of non-limiting example, the surfactant may be polypropoxy diethyl methylammonium chloride (e.g., VARIQUAT® CC-42NS, available from Evonik located in Essen, Germany) and/or a polyester/polyamine condensation polymer (e.g., Hypermer KD2, available from Croda Inc. located in Snaith, United Kingdom), in certain embodiments. In certain embodiments, the one or more additives may improve the wettability of the material 34 to facilitate coating the particles of the powder with the binder 24. The one or more additives may also change (e.g., modify) the surface tension of the binder solution 20 to facilitate jettability of the binder solution 20. For example, in certain embodiments, the binder solution 20 is generally considered jettable if the Ohnesorge number (e.g., the ratio of viscous forces to inertial and surface tension forces) is between approximately 0.1 and approximately 1.

In certain embodiments, the one or more additives may also include a solvent that dissolves the binder 24. The solvent may be aqueous or non-aqueous, depending on the selected binder 24, as well as other additives that may be in the binder solution 20. The solvent is generally non-reactive (e.g., substantially inert) such that it does not react with the powder material 34, the binder 24, or any other additives that may be in the binder solution 20. Additionally, in general, the solvent should readily evaporate after selective deposition of the binder 24 into the powder layer 12, which may facilitate curing to bond together the binder-coated particles of the printed layers 53. Example solvents of the binder solution 20 include, but are not limited to, water, methylene chloride ($CH_2Cl_2$), chloroform ($CHCl_3$), toluene, xylenes, mesitylene, anisole, 2-methoxy ethanol, butanol, diethylene glycol, tetrahydrofuran (THF), methyl ethyl ketone (MEK), trichloroethylene (TCE), or any other suitable solvent.

Following deposition of the layer 12 and the selective printing of the binder 24, as set forth in blocks 52 and 54 of FIG. 2, the illustrated method 50 continues with curing (block 62) the binder 24 to form a cured layer of the green body part 60. For example, as discussed above, the selectively deposited binder solution 20 may be a mixture of the binder 24 (e.g., polymer) and a solvent. While a portion of the solvent in the binder solution 20 may be evaporated during deposition (e.g., printing) of the binder 24, a certain amount of the solvent may remain within the layer of powder 12. Therefore, in certain embodiments, the green body part 60 may be thermally cured (in a subsequent, post-print step) at a temperature that is suitable for evaporating the solvent remaining in the printed layer 58 and allows for efficient bonding of the printed layers 58 of the green body part 60.

In certain embodiments, the layer of the green body part 60 may be cured via polymerization, wherein reactive monomers in the binder solution 20 polymerize to yield the binder 24. For example, the binder 24 may be polymerized in situ after selectively printing the binder solution 20 into the powder layer 12. Following deposition of the binder solution 20, the one or more binder precursors 25 (e.g., polymerizable monomers) in the binder solution 20 may be cured (e.g., reacted, cross-linked, polymerized) to form the printed layer 58 of the green body part. For example, in certain embodiments, the printed layer 58 may be exposed to heat, moisture, light, or any other suitable curing method that polymerizes the binder precursors 25 in the binder solution 20 to form the binder 24 in the printed layer 58. In certain embodiments, the binder solution 20 may include a radical initiator (e.g., azobisisobutyronitrile (AIBN)) to facilitate polymerization of the one or more polymerizable monomers. In one embodiment, the binder solution 20 includes binder precursors selectively deposited into the powder layer 12 that cure (e.g., polymerize, cross-link) rapidly (e.g., on the order of seconds) without addition supplied energy.

The method 50 typically involves the repetition of the acts of blocks 52, 54, and 62 to continue fabricating in a layer-by-layer manner until all of the layers of the entire green body part 60 have been printed. The binder 24 bonds (e.g., adheres, anchors, binds) each successive layer and provides a degree of strength (e.g., green strength) to the printed article to improve the integrity of the structure of the green body part during post-printing processes (e.g., debinding, sintering, etc.). That is, the green strength provided by the binder 24 maintains bonding between the powder material 34 within each of the layers, and blocks (e.g., resists, prevents) delamination of the layers during handling and post-printing processing of the green body part 60.

As discussed above, the printed part may be heated to temperatures above 1000° C. to consolidate the layers of powder material and form the consolidated part. The high temperatures (e.g., above 1000° C.) may cause distortions in the printed part, in particular printed parts with complex geometries. For example, during sintering, the printed layers are consolidated, which densifies the printed part and results in a certain degree of shrinkage. The printed part is generally porous before undergoing thermal processing. Therefore, consolidation of the printed layers in the printed part during post-printing thermal processing decreases a volume of the printed part to densify and compact the printed layers, generating a consolidated part. Densification of the printed part may cause certain structural features (e.g., overhangs, airfoils, or the like) of the printed part that are unsupported by other structural features to warp, sag, bend, deform, or otherwise change the overall geometry of the printed part. The distortions in the geometry may render the printed part unsuitable for use. The distorted printed part may be discarded, decreasing yields and increasing cost. Therefore, in the absence of the present disclosure, the binder jet printing processes for such parts may be inefficient and result in an undesirable throughput. However, by using the setter assemblies disclosed herein to support the printed part (e.g., the green body part or the brown body part) before heating (e.g., debinding and/or sintering) may mitigate thermally induced distortions.

Accordingly, once the desired number of printed layers 58 are deposited, the method 50 includes assembling (block 61) a setter assembly onto the green body part 60 to provide structural support and mitigate thermally induced distortions of the printed part (e.g., the green body part 60 and/or brown body part 68). The green body part 60 may be nested within the structural support. As used herein, a nested part is intended to denote a printed part that is partially or completely surrounded by a structural support such that at least a portion of an exterior surface of the printed part is in contact with the structural support. While the block 61 is discussed in the context of assembling the disclosed setter assembly onto the green body part 60, present embodiments also include assembling the setter assembly to the brown body part 68. Accordingly, the setter assemblies disclosed herein may be used to maintain the overall shape of a printed part during densification or other post-printing thermal processing.

As discussed in further detail below, the disclosed setter assemblies may include multiple separable components, which, when combined, provide support to one or more regions of the body part 60, 68 during debinding and/or sintering. A geometry of the setter assembly and/or the components in the assembly include features that facilitate assembly of the components onto the green body part 60 and removal from the brown body part 68 after sintering. Additionally, the geometry of the setter assembly is such that a difference in coefficient of thermal expansion of the printed part and the setter assembly is suitable to meet dimensional requirements of the consolidated part. That is, the setter assemblies disclosed herein are designed to accommodate for dimensional changes of the printed part during consolidation (e.g., sintering). In certain embodiments, the setter assemblies may include alignment features to facilitate assembly onto the printed part in a manner that allows tolerances (e.g., dimensional changes) of the printed part to be met during debinding and/or sintering to form the consolidated part.

Following assembly of the setter assembly 80 on the green body part 60, the method 50 includes removing (block 64) the binder 24 from the printed green body part 60 to generate a brown body part 68. During removal of the binder 24, as referred to as debinding, the green body part 60 is heated to break down the binder 24 into smaller compounds having a lower molecular weight compared to the binder 24. For example, the printed green body part 60 may be heated to a temperature that is approximately 500° C. or less, such as between approximately 250° C. and approximately 450° C., to facilitate removal of the binder 24. The conditions to which the printed green body part 60 is exposed during debinding (e.g., removal of the binder 24 from the printed layers of the printed green body part 60) decomposes the binder 24 into smaller molecules that may be readily released from the printed green body part 60 and generates the brown body part 68 having a substantial portion (e.g., approximately 95%, approximately 96%, approximately 97%, approximately 98%) of the binder 24 removed. In certain embodiments, a portion of the binder 24 and/or decomposition products of the binder 24 (e.g., oxides, such as silicon oxide) may remain in the brown body part 68 and may improve bonding of the powder material 34 within the brown body part 68, enabling an improved brown strength that maintains the structure of the brown body part 68 during handling between debinding and sintering.

Following removal of the binder 24 from the green body part 60, the method 50 includes sintering (block 72) the brown body part 68 to consolidate the powder material 34 to generate a consolidated additively manufactured part 74. During sintering, the brown body part 68 is generally exposed to a concentrated source of energy (e.g., a laser, electron beam, or any other suitable energy source) that heats the brown body part 68 and consolidates (e.g., densifies, connects) the powdered material 34 of the printed layers of the brown body 68 to form the consolidated part 74 (e.g., substantially solid part) having a density that is greater than the density of the brown body part 68. Sintering imparts strength and integrity to the brown body part 68, such that the consolidated part 74 is suitable for use in machinery for its intended application (e.g., as a component of a gas turbine engine or a gasification system). The sintering temperature is a temperature that is generally less than (e.g., approximately 30% of) a melting point of the powdered material 34, such that the particles of the powdered material 34 soften and form connections (e.g., necks or bridges) that bind together neighboring particles in the brown body part 68. In general, sintering temperatures may be in excess of 1000° C., depending on the properties of the powder material 34 used to fabricate the part. For example, in certain embodiments, when the powdered material 34 is a nickel alloy (e.g., INCONEL® 625), the sintering temperature may be between approximately 1250° C.-1270° C.

Following sintering of the brown body part 68 to form the consolidated part 74, the method 50 includes disassembly and removal (block 76) of setter assembly 80 from the consolidated part. For example, as discussed in further detail below, alignment pins used to removably couple the components of the setter assembly may be removed to detach and facilitate removal of the setter components from the consolidated part 74.

Figure 3A:
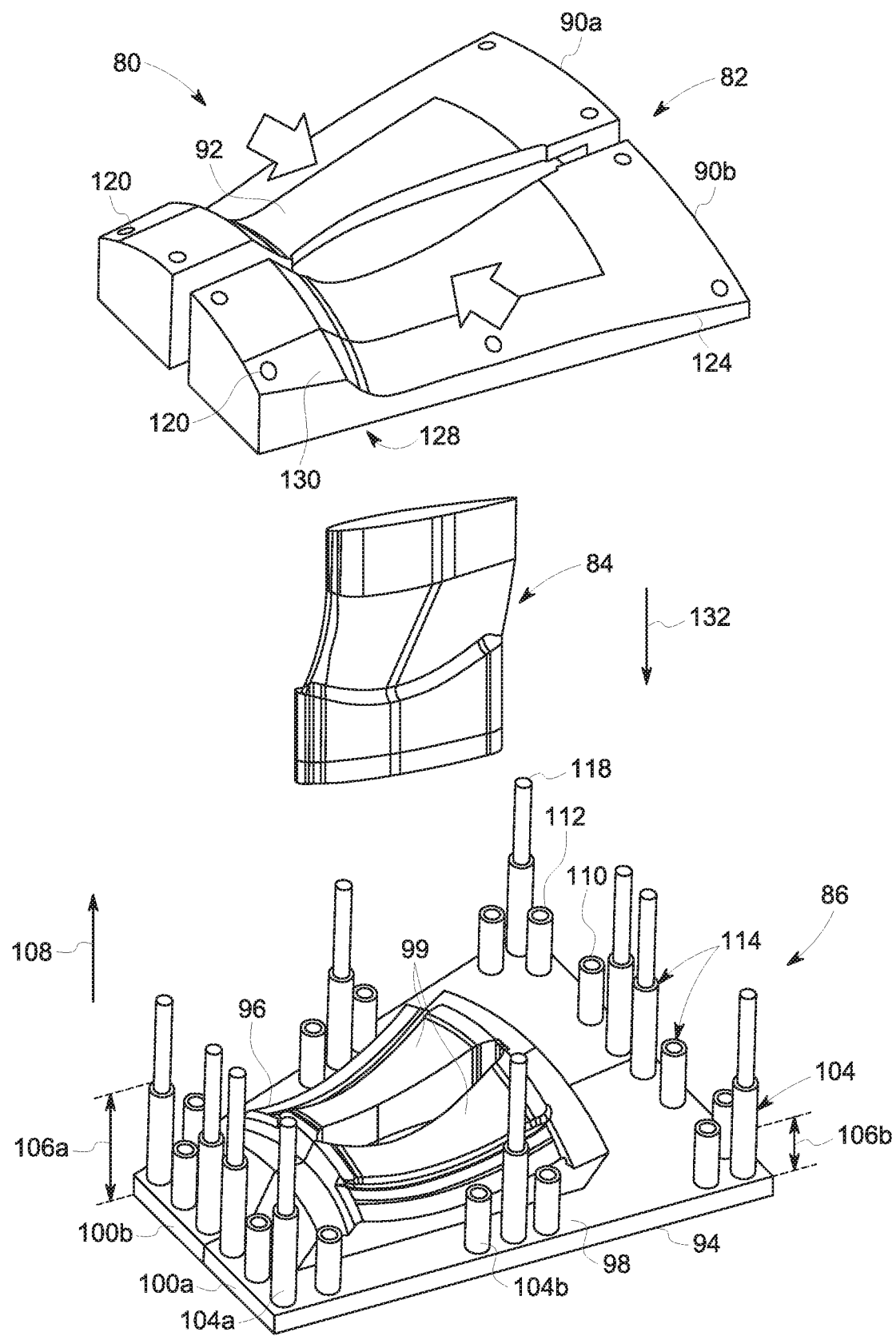
FIG. 3a is a perspective view of an embodiment of a setter assembly that may be used in performing the method of FIG. 2, wherein the setter assembly includes a top setter component, a core, a bottom setter component, and base.

FIG. 3a is a perspective view of an embodiment of a setter assembly 80 that may be used to provide support to printed part during post-printing thermal processing (e.g., debinding, sintering). The setter assembly 80 may be manufactured from any suitable material that does not react with the materials used to fabricate the printed part. For example, the setter assembly 80 may be manufactured from materials such as, but not limited to, metals, ceramics, refractory materials, or the like that do not undergo dimensional changes or react with the powder material 34 during heating at temperatures suitable for debinding or for sintering. In certain embodiments, one or more components of the setter assembly 80 may be coated with a protective layer (e.g., a polymer layer) that maintains the integrity of the setter assembly 80 and allows multiple reuses of the setter assembly 80. The setter assembly 80 may be customized to fit a respective geometry of the printed part being supported.

The setter assembly 80 includes a top setter component 82, a core 84, and a bottom setter component 86. The top setter component 82 may include a first top portion 90a and a second top portion 90b that are separable. That is, the first top portion 90a and the second top portion 90b are two separate pieces. However, in certain embodiments, the top setter component 82 is a single piece or unitary component. In certain embodiments, the top portions 90a, 90b may be mirror images of one another. In other embodiments, the top portions 90a, 90b may have different features that, when combined, support regions of a printed part (e.g., the green body part 60 and/or the brown body part 68) during post-printing thermal processing. The top setter component 82 may include features that conform and/or outline certain structural features of the brown body part 68. For example, an outward facing surface 91 of each top portion 90 may have a curvature 92 that is similar in shape to a curvature of a top portion (e.g., the overhang 148) of the brown body part 68, as discussed below with reference to FIG. 3b. This may facilitate positioning and assembly of the top setter component 82 onto the printed part, as discussed below.

The bottom setter component 86 includes a base 94 and a bottom setter 96 positioned on a top surface 98 of the base 94. In certain embodiments, the bottom setter 96 is removably attached to the base 94. For example, the base 94 may include coupling features (e.g., fasteners, clips, recesses, protrusions, or any other suitable coupling feature) that engage with a complementary coupling feature on a bottom surface 97 (e.g., surface that abuts the top surface 98) of the bottom setter 96. By removably coupling the bottom setter 96 and the base 94, the bottom setter 96 may be switched out depending on the geometry of the printed part. However, in certain embodiments, the bottom setter 96 and the base 94 are a single structure or unitary. Similar to the top setter component 82, the bottom setter 96 may include surface features that conform to or outline structural features of the brown body part 68 to facilitate seating the brown body part 68 within the assembled setter assembly 80. For example, in the illustrated embodiment, the bottom setter 96 includes a curvature 99 that is representative of a curvature associated with the brown body par, as discussed below.

Similar to the top setter component 82, the base 94 may have a first bottom panel 100a and a second bottom panel 100b, each independently separable from one another. The panels 100a, 100b may facilitate assembly and removal of the setter assembly 80 to and from the printed part (e.g., the green or brown body part), as discussed in further detail below. Similar to the top setter component 80, the bottom panels 100a, 100b may be mirror images of one another or may be tailor made of a specific part to be printed. The bottom panels 100a, 100b may include surface features that are complimentary to the top setter component 82 to facilitate assembly of the setter assembly 80 around and about the printed part. In other embodiments, the base 94 is a single continuous structure with no separable parts.

The base 94 includes a plurality of protrusions 104 (e.g., extensions, stanchions, posts, pin-holders, and the like) extending away from the top surface 98. In the illustrated embodiment, the protrusions 104 extend a different distance away from the top surface 98. For example, protrusions 104a extend a first distance 106a away from the top surface 98 in an axial direction 108. Protrusions 104b extend a distance 106b away from the top surface 98 in the axial direction 108, which is less than the distance 106a. Accordingly, the a length of the protrusions 104a is greater than a length of the protrusions 104b. The variability in the distance 106 between the protrusions 104 facilitates alignment of the top setter component 82 and the base 94, and allows a distance between the top setter component 82 and the base 94 to be adjusted to meet the tolerances of the printed part during and after heating, as discussed in further detail below.

Figure 3B:
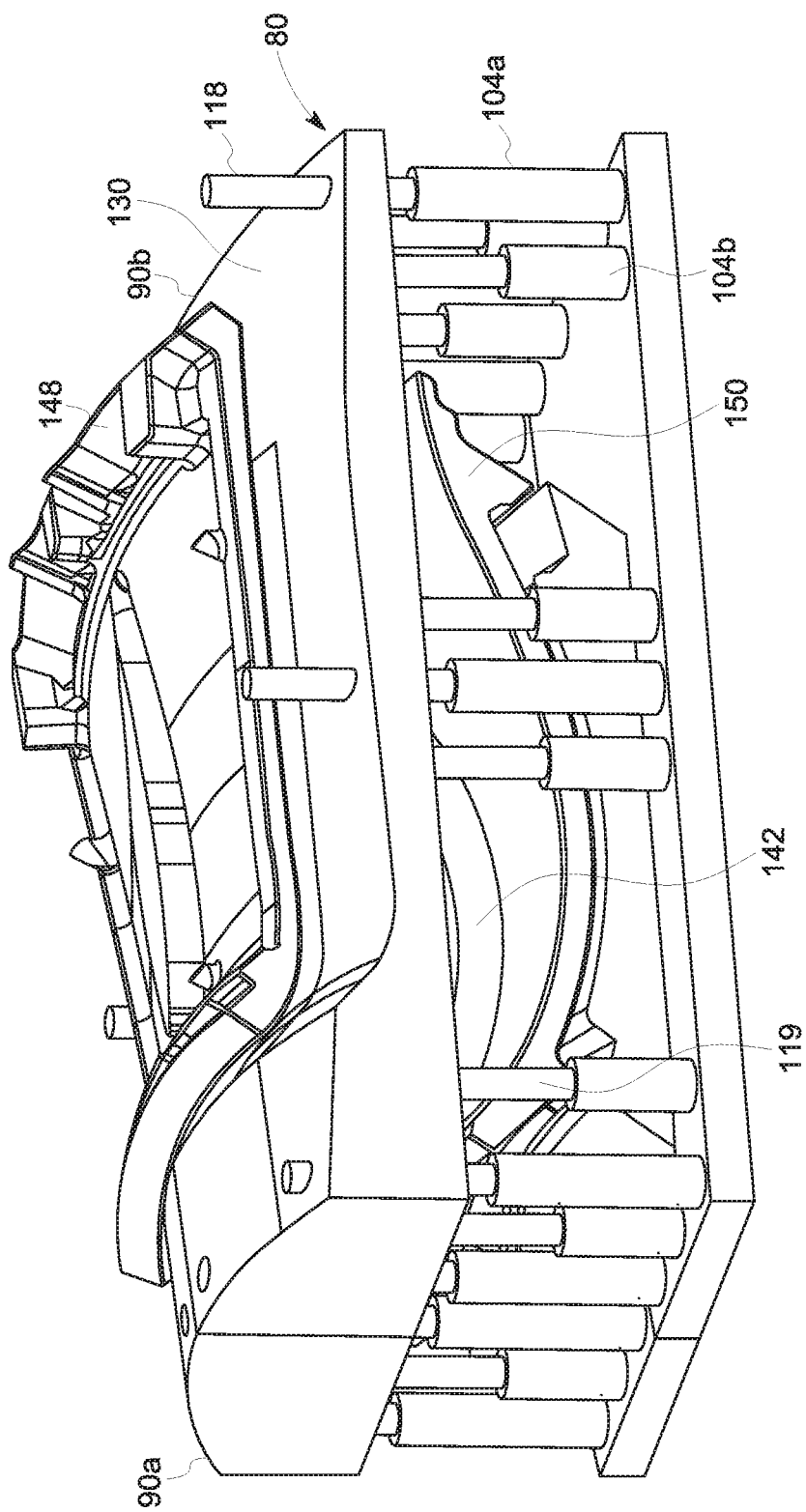
FIG. 3b is a perspective view of an embodiment of the setter assembly of FIG. 3a assembled onto the printed part.

At least a portion of each protrusion 104 is hollow, thereby forming a bore 110 having an opening 112 at a terminating end 114 of each protrusion 104. Before the setter assembly 80 is assembled onto the printed part, alignment pins 118 may be inserted into the bore 110 of each respective protrusion 104a. For example, FIG. 3b is a perspective view of the setter assembly 80 assembled on a binder-jet printed part 120, in accordance with an embodiment of the present disclosure. The binder-jet printed part 120 is nested within the setter assembly 80 such that at least a portion of a surface of the binder-jet printed part 120 is in contact with the setter assembly 80 to provide mechanical support to regions of the binder-jet printed part 120 that may be prone to deformation during thermal processing. In the illustrated embodiment, a portion of the alignment pins 118 are disposed within respective openings 122 on the top setter component 82. The top setter component 82 is supported by support pins (e.g., support beams) 124. Similar to the alignment pins 118, the support pins 124 may be inserted into the bore 110 of each respective protrusion 104b. During assembly of the setter assembly 80 on the brown body part 68, the alignment pins 118 are aligned with openings 122 located along portions of the top setter component 82. The openings 122 extend from an inward facing surface 128 to the outward facing surface 91 of the top setter component 82, thereby forming a passageway for the alignment pins 118 to be inserted through, as shown in the illustrated embodiment. In certain embodiments, the alignment pins 118 protrude out from the outward facing surface 91. In other embodiments, a terminus of the alignment pins 118 may be flush with or below the outward facing surface 91. The alignment pins 118 and the support pins 124 may printed using the binder jet printer 10 from the powder material 34 or other similar powder material.

As discussed in further detail below, the support pins 124 abut the inward facing surface 128 of the top setter component 82 to provide support to the regions of the top setter component 82 and facilitate movement of the top setter component 82 toward the base 100 in a direction 132, as shown in FIG. 3a. For example, the support pins 124 may be manufactured from a material that shrinks when heated to a certain temperature. As the support pins 124 shrink, the top setter component 82 moves in the direction 132. In this way, the setter assembly 80 may accommodate for the dimensional changes of the printed part 120 resulting from shrinkage and densification during post-printing thermal processing.

Figure 4:
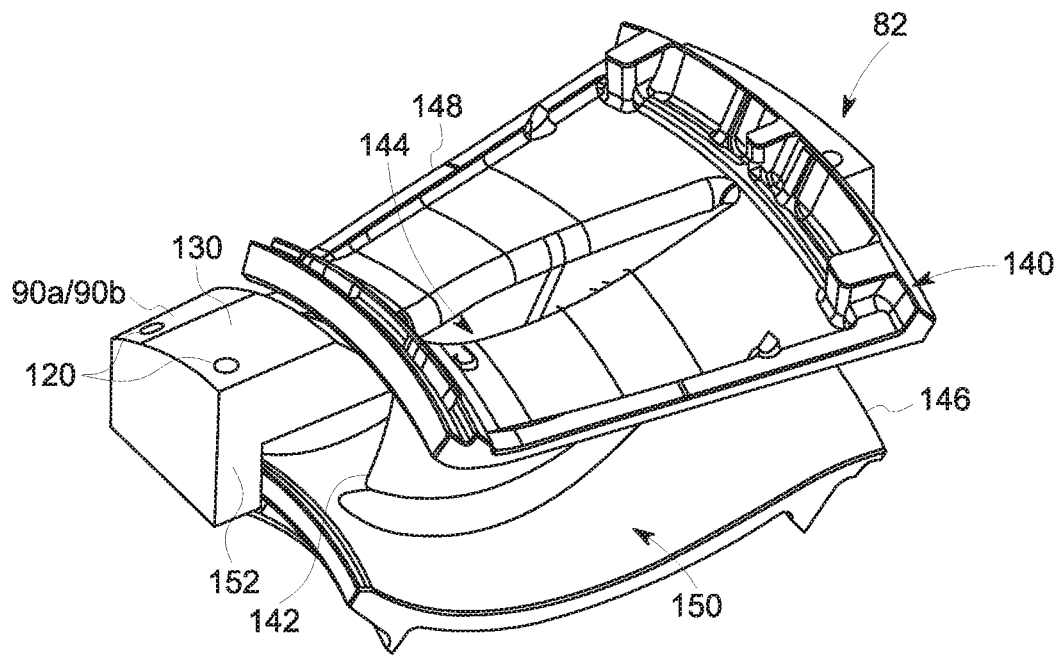
FIG. 4 is a perspective view of an embodiment of a portion of the top setter component of the setter assembly of FIG. 3, wherein the top setter component is partially assembled on the printed part.
Figure 5:
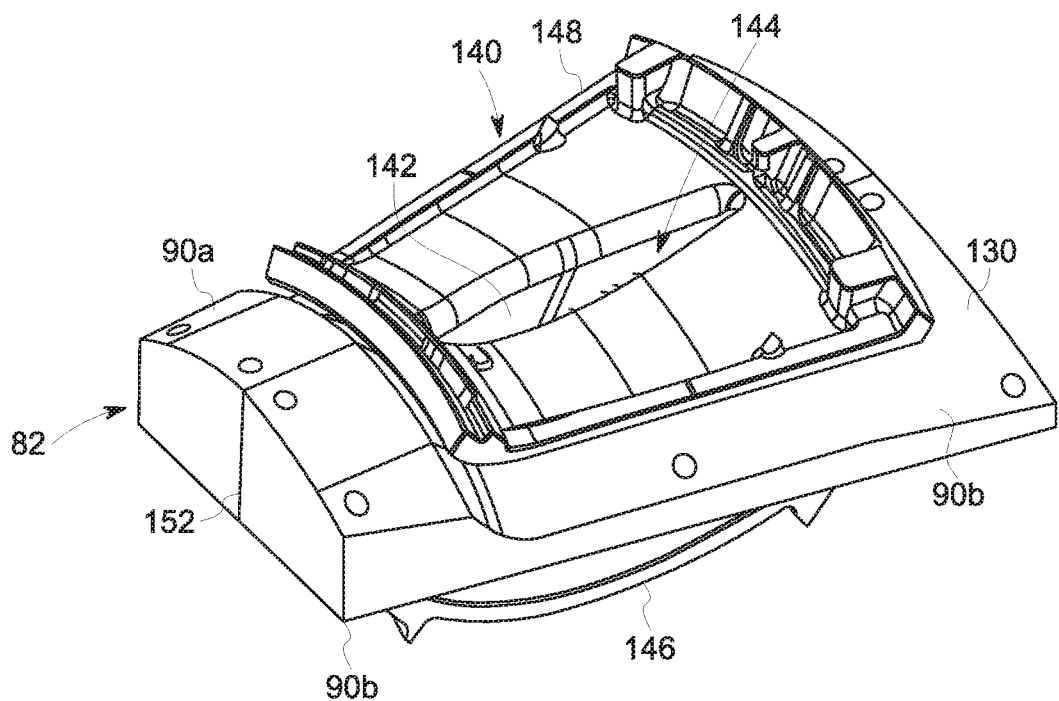
FIG. 5 is a perspective view of an embodiment of the top setter component of the setter assembly of FIGS. 3 and 4 assembled on the printed part.

As discussed above, the components 82, 86 and the core 84 are assembled onto a printed part to form the setter assembly 80. For example, FIG. 4 is a perspective view of an embodiment of the binder-jet printed part 120 (e.g., the green body part 60 or brown body part 68) and a portion of the top setter component 82. In the illustrated embodiment, the printed part 120 includes a central body 142 having an airfoil 144, a flange-like base 146, and an overhang 148. During post-printing thermal processing (e.g., debinding and/or sintering), the overhang 148 may deform or sag due, in part, to gravitational forces and/or shrinkage. To mitigate the deformation of the overhang 148, the top setter component 82 is positioned underneath the overhang 148 (e.g., between the overhang 148 and the flange-like base 146). For example, during assembly of the setter assembly 80 on the printed part 120, each top portion 90a, 90b is positioned on a respective side 150 of the central body 142. The top portions 90a, 90b are pushed in opposite directions toward one another such that the central body 142 is positioned between the top portions 90a, 90b. Each top portion 90a, 90b includes an abutment surface 152 that engages with the respective abutment surface of the other top portion 90a, 90b when the top setter component 82 is assembled onto the printed part 120, as shown in FIG. 5. The abutment surface 152 of each respective top portion 90a, 90b may include coupling features that secure, or otherwise removably attach, the top portion 90a to the top portion 90b, thereby assembling the top setter component 82 of the setter assembly 80 on the printed part 120. The coupling features may also facilitate alignment and proper positioning of the top portions 90a, 90b during assembly onto the printed part 120.

As illustrated in FIG. 5, the overhang 148 of the printed part 120 rests on the outward facing surface 91 of the top setter component 82. As discussed above, the outward facing surface 91 may include surface features (e.g., curvature 92, contours) that conform to a shape of the overhang 148. In this way, the top setter component 82 supports the overhang 148 during post-printing thermal processing to mitigate deformation of the overhang 148 during heating that may be caused by gravitational forces and/or volume changes (e.g., densification).

Once the top setter component 82 is assembled onto the printed part 120, the core 84, as previously discussed with respect to FIG. 3a and the base component 86 of the setter assembly 80 may be assembled onto the printed part 120. However, in other embodiments, the core 84 and/or the base component 86 may be assembled onto the printed part 120 prior to assembly of the top setter component 82. Before coupling the top setter component 82 to the bottom setter component 86, the alignment pins 118 and the support pin 124 are inserted into the bore 110 of each respective protrusion 104. A length of the pins 118, 124 may be determined based on an amount of shrinkage (e.g., densification) of the printed part 120 during sintering. As discussed above, the pins 124 shrink during sintering to allow the top setter component 82 to move in the direction 132 toward the bottom setter component 86 to accommodate for dimensional changes of the printed part 120 to form the consolidated part.

As best shown in FIGS. 3a and 3b, during assembly, the protrusions 104a are aligned with the openings 122 on the top setter component 82, such that the alignment pins 118 in the protrusions 104a are inserted into a respective opening 122, thereby coupling the top setter component 82 and the bottom setter component 86. The support pins 124 in the protrusions 104b provide support to regions of the top setter component 82 and enable movement of the top setter component 82 toward the bottom setter component 86 in the direction 132 during sintering to account for shrinkage of the printed part 120.

The core 84 may be coupled to the bottom setter 96 before assembling the bottom setter component 86 on the printed part 120. However, in other embodiments, the core 84 may be coupled to the printed part 120 before assembly of the setter components 82, 86 on the printed part 120. The core 84 is inserted into the airfoil 144 of the printed part 120 and extends from the flange-like base 146 to the overhang 148, filling the volume of the airfoil 144. The airfoil 144 may warp or sag during post-printing thermal processing, thereby distorting the shape of the airfoil 144 and affecting the overall shape and properties of the printed part 120. The core 84 provides support to the airfoil 144 and mitigates distortion that may occur during sintering or other post-printing thermal processing.

Figure 6:
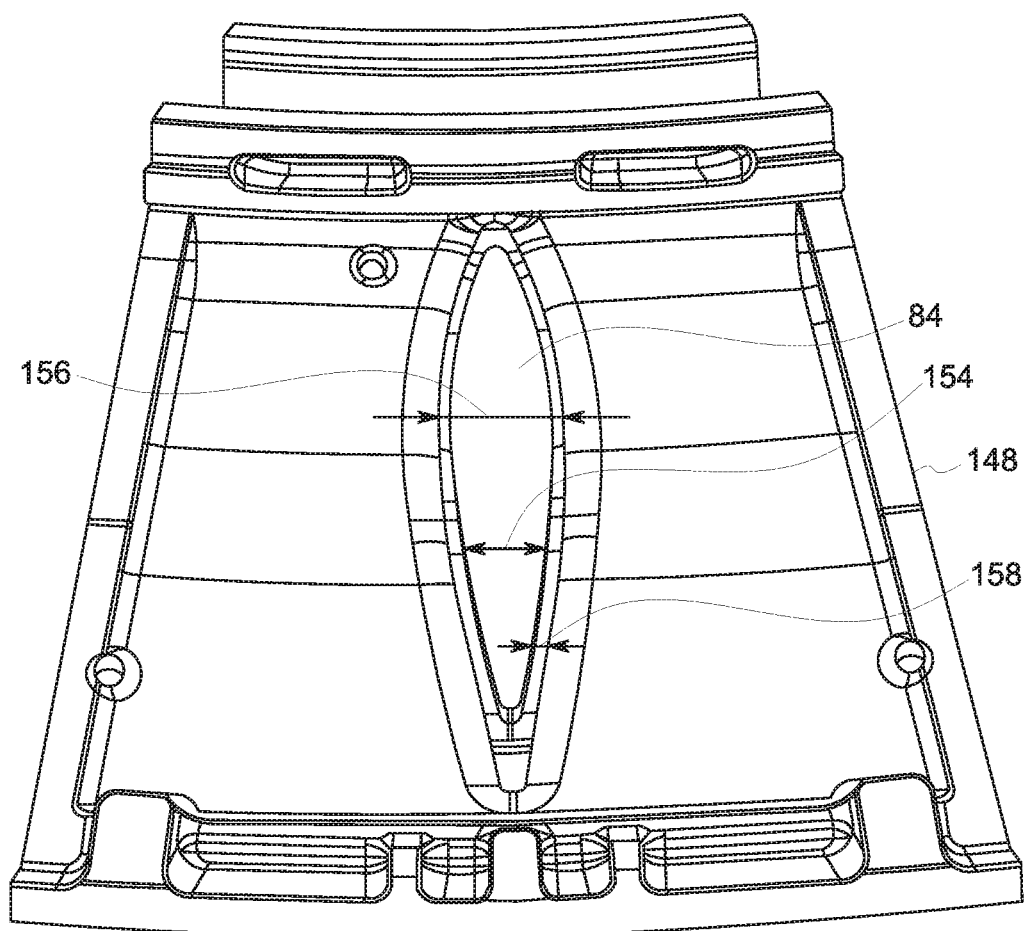
FIG. 6 is a top view of an embodiment of the printed part having an airfoil and the core of the setter assembly positioned within the airfoil.

FIG. 6 is a top view of the printed part 120 and the core 84 within the airfoil 144. The core 84 conforms to the shape of the airfoil 144 such that a gap 158 is formed between an inner surface of the airfoil 144 and an outer surface of the core 84. As discussed in further detail below, the gap 158 accommodates dimensional changes of the printed part 120 resulting from shrinkage to densify the printed part 120 and consolidate the printed layers. For example, as shown in FIG. 6, the core 84 has a dimension 154 that is smaller than an inner dimension 156 of the airfoil 144 such that the gap 158 is formed between the core 84 and the airfoil 144. The gap 158 provides a tolerance to allow for changes in the dimension 156 of the airfoil 144 resulting from shrinkage of the printed part 120 during debinding and/or sintering. For example, the dimension 156 of the airfoil 144 may decrease, thereby decreasing the gap 158 between core 84 and the airfoil 144. The core 84 may be a single piece or multiple pieces that are assembled together to form the core 84. Disassembly and removal of the core 84 from the airfoil 144 after sintering the printed part 120 may be facilitated when the core 84 is assembled by multiple separable pieces.

As best shown in FIG. 3b the printed part 120 that is below the overhang 148 is nested within the setter assembly 80 between the top setter component 82 and the bottom setter component 86. The flange-like base 146 of the printed part 120 rests on top of the bottom setter 96. As discussed above, the bottom setter 96 conforms to the structural features of the flange-like base 146. As such, the flange-like base 146 may be seated within and supported by the bottom setter 96 to mitigate distortions that may occur during post-printing thermal processing. Similar to the flange-like base 146, the overhang 148 rests on the outward facing surface 91 of the top setter component 82. The outward facing surface 91 includes features that conform to structural features of the overhang 148 to facilitate supporting regions of the overhang 148 that may be prone to distortions.

Figure 7:
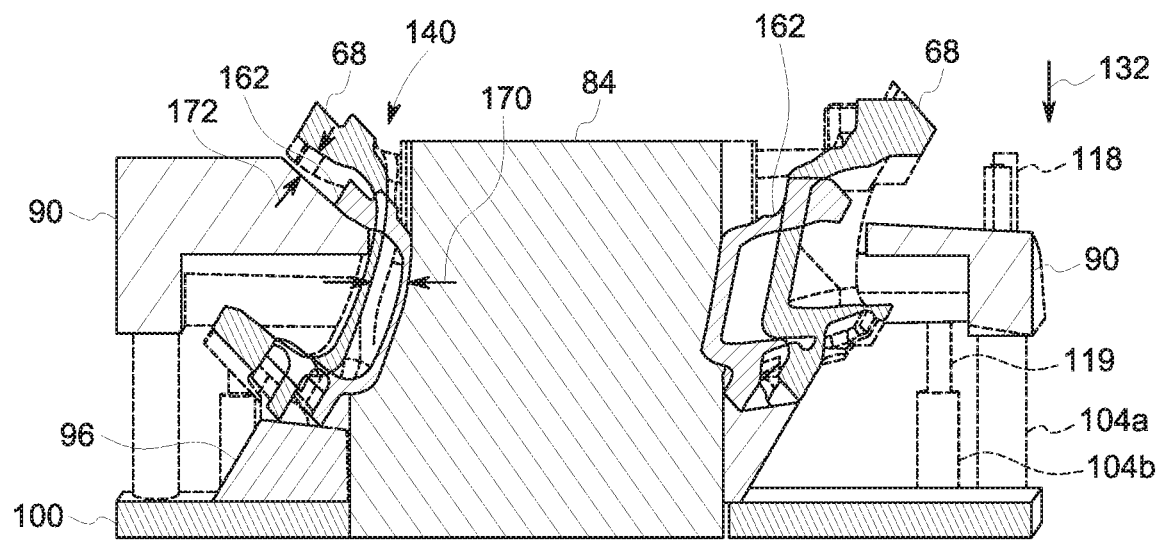
FIG. 7 is a cross-sectional side view of an embodiment of the setter assembly and printed part of FIG. 3b before and after sintering.
Figure 8:
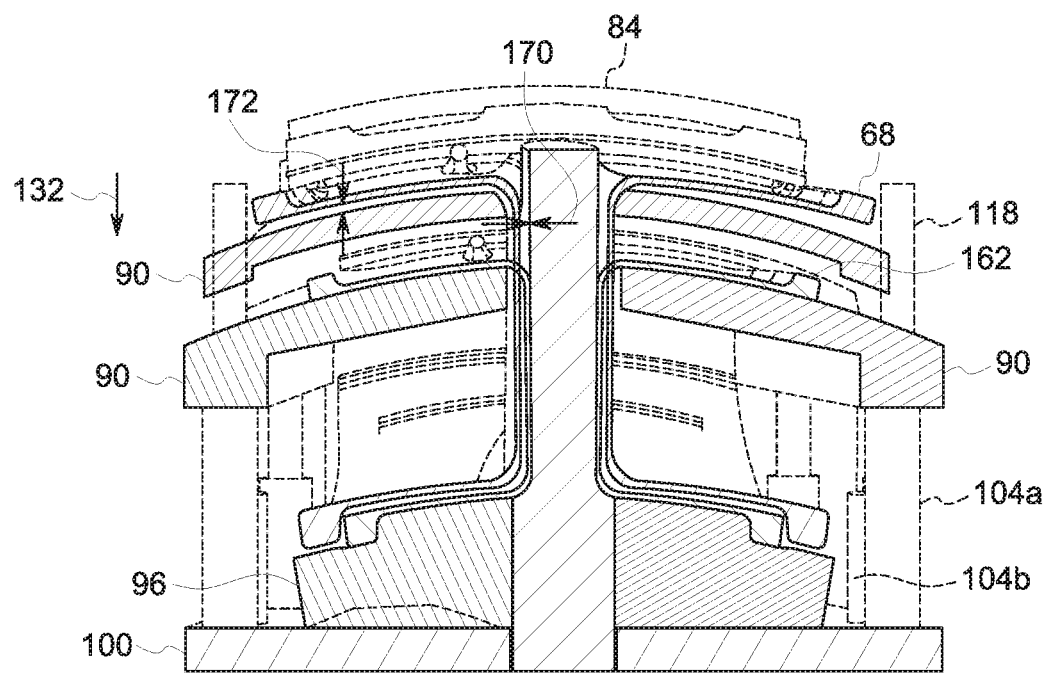
FIG. 8 is a cross-sectional front view of an embodiment of the setter assembly and printed part of FIG. 3b before and after sintering.

As discussed above, the setter assembly 80 provides support to certain regions of the brown body part 68 to mitigate distortion (e.g., warping or sagging) that may be caused by gravitational forces and/or densification of the brown body part 68. FIGS. 7 and 8 are cross-sectional views of the setter assembly 80 and the printed part 120 before and after sintering. As shown in the illustrated embodiment, the setter assembly 80 is assembled onto the brown body part 68 as discussed above. The setter assembly 80 is designed in a manner that creates gaps 170, 172 between portions of the brown body part 68 and the core 84 and the top setter 90, respectively. The gaps 170, 172 provide a transition window (e.g., a dynamic size window) for the dimensional changes of the brown body part 68 during sintering to form the consolidated part 162. As shown in FIGS. 7 and 8, the brown body part 68 shrinks as the layers of the powder material 34 consolidate to generate the consolidated part 162. Similarly, the support pins 124 shrink to move the top setter component 82 in the direction 132 toward the bottom setter component 96. For example, a length of the support pins 119 may shrink (e.g., decrease) between approximately 5% and 50% during sintering of the brown body part 68. In this way, the top setter component 82 may move relative to the base 100 to allow for dimensional changes of the printed part, and continue to support the printed part throughout sintering to transition the brown body part 68 into the consolidated part 162. The curvature and shape of the top setter component 82, the core 84, and the bottom setter component 96 provide support to the brown body part 68 as it shrinks to form the consolidated part 162. The curvature and shape of the components 82, 86 and the core 84 provide the final curvature of the consolidated part 162, which may be different from the curvature of the brown body part 68, as shown in FIGS. 7 and 8.

As discussed above, after post-printing processing is complete, the setter assembly 80 is disassembled and removed from the consolidated part 74, in accordance with block 76 of the method 50 of FIG. 2. For example, during disassembly, the alignment pins 118 may be removed from the respective openings 122 to decouple the top setter component 82 and the bottom setter component 86. Once the alignment pins 118 are removed, the top portions 90a, 90b or the base 100 may be separated from the consolidated part 74. In certain embodiments, the bottom setter component 96 is removed along with the base 100. In other embodiments, the bottom setter component 96 is separated from the consolidated part in a separate step. Following removal of the components 82, 86 and the base 100, the core 84 may be separated from the consolidated part 74. As discussed above, the core 84 may include two or more separable components. During disassembly and removal, a portion of the core 84 may be removed from a top side of the consolidated part 74 and another portion of the core 84 may be removed from a bottom side of the consolidated part 74. As should be noted, the components 82, 86, the base 100, and the core 84 may be disassembled and removed in any suitable order. Once separated from the setter assembly 80, the consolidated part 74 may be Hot Isotactic Pressurized (HIP) to obtain close to full densities (density>99.9%).

As discussed above, the setter assembly disclosed herein may be used in continuous additive manufacturing systems to provide support to a binder-jet printed article, such as a metal or ceramic machine part, during post-printing thermal processing, such as debinding and sintering. The disclosed setter assembly includes separable setter components that may be individually arranged and assembled onto the printed part prior to the post-printing thermal processing.

The setter components may be designed in a manner that supports the printed part while also accounting for differences in the coefficient of thermal expansion between the printed part and the setter assembly to meet dimensional changes of the printed part during the thermal processes (e.g., sintering). As such, the setter assembly mitigates distortions in the structure of the printed part resulting from gravity induced warping or sagging during debinding and/or densification to form the consolidated part. Additionally, by using the disclosed setter assembly, printed parts having more complex geometries may be achieved with continuous additive manufacturing techniques.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A setter assembly for use in manufacturing a binder-jet printed part, comprising:
   a base;
   a first setter component comprising a first setter portion and a second setter portion configured to be removably coupled to the first setter portion;
   a plurality of protrusions disposed on and extending away from a surface of the base, wherein the plurality of protrusions is configured to align the base with the first setter component and enable coupling of the first setter component and the base; and
      a second setter component positioned between the base and the first setter component, wherein the second setter component is disposed on the surface, and wherein the first setter component, the second setter component, and the base are configured to be assembled onto a printed part such that at least a portion of the printed part is nested between the first setter component and the second setter component.

2. The setter assembly of claim 1, comprising a core coupled to the second setter component and configured to be inserted into a hollow portion of the printed part.

3. The setter assembly of claim 2, wherein the hollow portion includes an airfoil.

4. The setter assembly of claim 2, wherein the second setter component comprises an opening configured to receive at least a portion of the core when the setter assembly is assembled on the printed part.

5. The setter assembly of claim 1, wherein a first portion of the plurality of protrusions has a length that is greater than a second portion of the plurality of protrusions.

6. The setter assembly of claim 5, comprising a plurality of pins disposed within a bore of each protrusion of the plurality of protrusions, wherein the plurality of pins comprises alignment pins disposed within the first portion of the plurality of protrusions and support pins disposed within the second portion of the plurality of protrusions.

7. The setter assembly of claim 6, wherein a terminus of the support pins abuts an inward facing surface of the first setter component and support the first setter component when setter assembly is assembled on the printed part, and wherein a length of the support pins is configured to decrease in response to thermal processing to move the first setter component relative to the second setter component.

8. The setter structure of claim 6, wherein the first setter component comprises openings, wherein the alignment pins are inserted into and extend through the openings to removably couple the first setter component and the base, and wherein the alignment pins enable the first setter component to move relative to the base.

9. The setter structure of claim 1, wherein an outward facing surface of the first and second setter portions comprise a curvature representative of a shape of at least a portion of the printed part.

10. The setter structure of claim 1, wherein the plurality of protrusions is arranged along a portion of an outer perimeter of the base.

11. A part manufactured via a binder-jet printing process comprising the steps of:
   heating a green body part formed from a plurality of printed layers above a first temperature to remove a binder used to print the part and generate a brown body part;
   coupling a setter assembly to the brown body part, wherein the setter assembly comprises a base, a top setter, a bottom setter positioned between the base and the top setter, and a plurality of support pins extending between the base and the top setter such that a terminus of each support pin of the plurality of support pins abuts an inward facing surface of the top setter, and wherein a portion of the brown body part is positioned above the top setter and another portion of the brown body is nested between the top setter and the bottom setter; and
   heating the brown body part and the setter assembly above a second temperature to sinter the powder to generate the part, wherein the setter assembly is configured to support one or more regions of the brown body part to block distortion of the brown body part during heating to generate the part.

12. The part of claim 11, wherein the support pins shrink to decrease a length of the support pins and move the top setter toward the bottom setter during heating of the brown body part.

13. The part of claim 11, wherein the part comprises an airfoil and the setter assembly comprises a core, and wherein coupling the setter assembly to the part comprises inserting the core into the airfoil such that at least a portion of the core is positioned between the top setter and the bottom setter.

14. The part of claim 13, wherein the core is removably coupled to the bottom setter.

15. The part of claim 13, wherein coupling the setter assembly to the part comprises assembling the base, the top setter, and the bottom setter onto the brown body part to form the setter assembly.

16. The part of claim 13, wherein the setter assembly comprises a plurality of alignment pins positioned on the base, and wherein coupling the setter assembly to the part comprises aligning each alignment pin of the plurality of alignment pins with an a respective opening disposed on the first setter component.

17. The part of claim 16, wherein the base comprises protrusions extending from an outward facing surface and the top setter comprises openings, wherein, when the protrusions align with a respective opening of the top setter, an alignment pin of the plurality of alignment pins extends through the opening and into a bore of the protrusion.

18. The part of claim 11, wherein the top setter moves relative to the base during thermal processing.

19. The part of claim 11, comprising disassembling and removing the setter assembly from the part.

20. A method for additive manufacturing of a part, comprising:
assembling a setter assembly onto a binder-jet printed part, wherein the setter assembly comprises a base, a first setter component, a second setter component positioned between the base and the first setter component, and support pins extending between the base and the first setter component, wherein a terminus of the support pins abuts an inward facing surface of the first setter component, and wherein at least a portion of the binder-jet printed part is nested between the first setter component and the second setter component;
heating the binder-jet printed part and the setter assembly to debind or sinter the binder-jet printed part, wherein a length of the support pins decreases in response to thermal processing of the binder-jet printed part to move the first setter component toward the base; and
disassembling and removing the setter assembly from the thermally-processed part.

21. The method of claim 20, wherein the setter assembly comprises a core positioned between the first setter component and the second setter component, wherein the core is configured to be inserted into an airfoil of the binder-jet printed part to block distortion of the airfoil during heating.

22. The method of claim 20, wherein assembling the setter assembly comprises:
aligning one or more protrusions extending from the base with a corresponding opening disposed on the first setter component, wherein the one or more protrusions comprises an alignment pin; and
inserting the alignment pin into and through the opening, wherein the aligning pin is configured to removably couple the first setter component to the base.

23. The method of claim 20, comprising:
depositing a layer of a powder on a working surface of a binder-jet printer;
selectively printing a binder solution comprising a binder into a layer of powder in a pattern to generate a printed layer, wherein the pattern is representative of a structure of a layer of a part; and
curing the binder in the printed layer to generate a layer of the binder-jet printed part, wherein the binder-jet printed part is formed from a plurality of printed layers.

* * * * *